United States Patent [19]

Thomsen et al.

[11] Patent Number: 4,532,166
[45] Date of Patent: Jul. 30, 1985

[54] WELDING OF WEB MATERIALS

[75] Inventors: Karl V. Thomsen, Ontario; Richard W. Radler, Marion, both of N.Y.

[73] Assignee: Xerox Corporation, Stamford, Conn.

[21] Appl. No.: 538,409

[22] Filed: Oct. 3, 1983

[51] Int. Cl.³ .............................................. B32B 3/24
[52] U.S. Cl. ..................................... 428/57; 428/137; 428/139; 428/140
[58] Field of Search .................. 428/57, 139, 140, 137

[56] References Cited

U.S. PATENT DOCUMENTS

| | | | |
|---|---|---|---|
| 1,278,270 | 9/1918 | Wilber | 428/139 |
| 2,679,468 | 5/1954 | Pitman | 428/57 |
| 3,459,610 | 8/1969 | Dijkers et al. | 156/73 |
| 3,879,256 | 4/1975 | Rust | 156/580 |
| 3,939,033 | 2/1976 | Grgach et al. | 156/515 |
| 3,947,307 | 3/1976 | Buchscheidt | 156/73.1 |
| 4,339,488 | 7/1982 | Brokmann | 428/139 |

Primary Examiner—Alexander S. Thomas
Attorney, Agent, or Firm—Peter H. Kondo; John E. Beck; Ronald Zibelli

[57] ABSTRACT

A welded web comprising a first edge of a web having at least one aperture overlapping a second edge of a web comprising thermoplastic material on an exposed surface along the second edge to form a region of contiguous contact between the first edge and the second edge, at least a portion of the thermoplastic material at least partially filling the aperture thereby bonding the first edge to the second edge. The web may be formed by a process comprising providing a web having a first edge, providing a web having a second edge, forming at least one aperture in at least the first edge, overlapping the first edge over the thermoplastic material on the exposed surface along the second edge whereby the thermoplastic material on the second edge at least covers the aperture to form a region of contiguous contact between the first edge and the second edge, raising the temperature at least in the region of contiguous contact adjacent the aperture whereby thermoplastic material from the second edge at least partially fills the aperture thereby bonding the first edge to the second edge.

6 Claims, 9 Drawing Figures

Also referenced as 4,532,166

WELDING OF WEB MATERIALS

BACKGROUND OF THE INVENTION

This invention relates in general to welded web material and processes for producing the welded web material.

Thermoplastic webs may be joined by overlapping the edge of one web over another and placing the overlapped or seam portion of the webs over a base beneath a vibrating welding element. The vibrating welding element may be a horn vibrating at an ultrasonic frequency while it is brought into forced contact with one side of the overlapped webs while the other side of the overlapped web seam is supported on an anvil surface. Transfer of vibratory energy from the horn to the web material is effected upon impact of a suitably shaped surface of the horn on the seam of the web material. The vibrating energy causes surface heat to be generated between the overlapping webs along the area of contiguous contact between the webs. The horn normally resonates toward and away from the seam at a frequency of about 16 kHz or higher. The welding may be in the form of a chain of spots along the seam or a continuous weld. The technique of ultrasonic welding of thermoplastic material is well known and illustrated, for example, in U.S. Pat. No. 3,879,256, U.S. Pat. No. 3,939,033, U.S. Pat. No. 3,947,307 and U.S. Pat. No. 3,459,610, all incorporated by reference herein in their entirety.

Although ultrasonic welding can be utilized to join together webs of thermoplastic material, it has been found that the welded seam is the weakest portion of the joined webs and can be, for example, only about one-third as strong as the remainder of the joined webs. Further, the joint formed by ultrasonic welding tends to be more brittle than the remainder of the joined webs. Moreover, coated webs, particularly those having a coating thickness greater than about 15 micrometers, tend to delaminate at the seam when bent around small diameter rods or rollers. Thus, welded thermoplastic webs and techniques for making welded webs exhibit deficiencies such as welded web seams that have less strength and increased brittleness.

SUMMARY OF THE INVENTION

It is an object of this invention to provide a welded web comprising a first edge containing at least one aperture overlapping the second edge of a web comprising thermoplastic material wherein a portion of said thermoplastic material at least partially fills said aperture. The welded web is prepared by forming at least one aperture in at least the first edge, overlapping the first edge over the second edge whereby the second edge at least covers the aperture, raising the temperature at least in the region adjacent the aperture, whereby thermoplastic material from the second edge at least partially fills the aperture in the first edge thereby bonding the first edge to the second edge.

BRIEF DESCRIPTION OF THE DRAWINGS

A more complete understanding of the processes and device of the present invention can be obtained by reference to the accompanying drawings wherein.

DETAILED DESCRIPTION OF THE INVENTION

Figure 1:
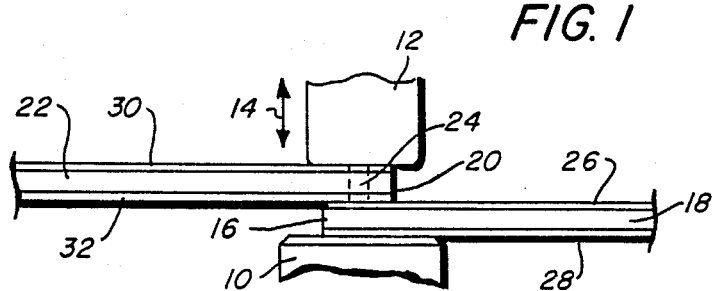
FIG. 1 graphically illustrates a sectional side view of web members to be joined by the process of this invention.

Referring to the figures, in an ultrasonic welding apparatus known per se, a fragmentary cross-section of an anvil 10 for the acceptance of parts to be welded and a fragmentary cross-section of an ultrasonic horn 12, also referred to as a sonotrode, vibrating along a vertical axis 14 are shown in FIG. 1. The edge 16 of thermoplastic web 18 is supported by the upper surface of anvil 10 and the edge 20 of the web 22 is positioned so that edge 20 of web 22 overlaps edge 16 of web 18. Edge 20 of web 22 contains aperture 24 shown in the side view of FIG. 1 and in the plan view of FIG. 2. In operation, horn 12 is brought into compressive engagement with web 22 and thermoplastic web 18 which are supported by anvil 10. The welding surface of horn 12 and the supporting surface provided by anvil 10 may be of any suitable shape such as the flat or curved cross-section shapes illustrated, for example, in U.S. Pat. No. 3,459,610, incorporated herein by reference in its entirety. The high vibration frequency of the horn 12 along the vertical axis 14 causes the temperature of at least the contiguous overlapping surfaces of thermoplastic web 18 and web 22 to increase until at least the thermoplastic material in web 18 flows and at least partially fills apertures 24. Welding of the contiguous overlapping surfaces of thermoplastic web 18 and web 22 will also occur if web 22 also comprises thermoplastic material which flows as a result of the applied energy of ultrasonic oscillations. In FIG. 1, the thermoplastic web 18 is shown coated with thermoplastic coatings 26 and 28 and web 22 is shown coated with thermoplastic coatings 30 and 32. Maximum bonding strength between thermoplastic web 18 and web 22 is achieved when sufficient ultrasonic energy is applied in the regions surrounding the apertures 24 to cause sufficient softening of thermoplastic web 18 and thermoplastic coating 26 to flow and completely fill apertures 24. The schematic sectional view of such a bonded joint or seam is illustrated in FIG. 3.

Figure 2:
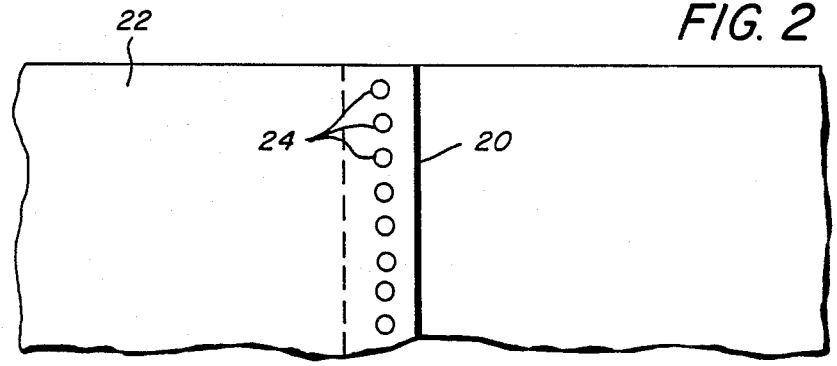
FIG. 2 graphically illustrates a sectional plan view of the web members to be joined by the process of this invention.
Figure 3:
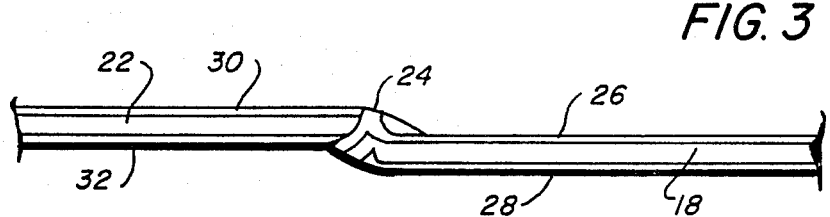
FIG. 3 graphically illustrates a sectional side view of a seam arrangement of a principal feature of the invention.
Figures 4, 5:
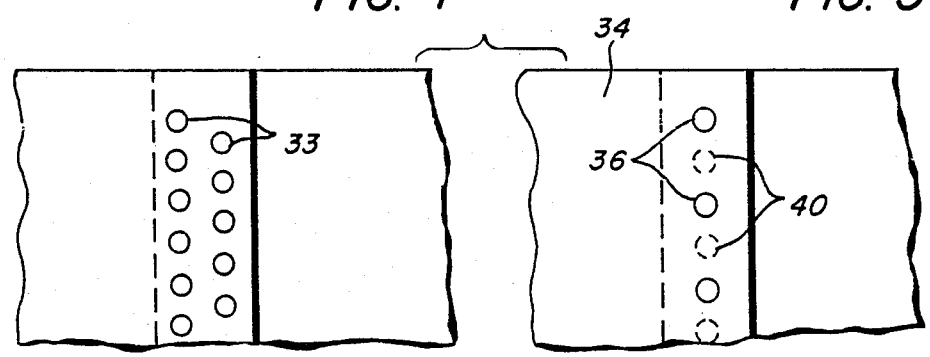
FIG. 4 graphically illustrates a sectional plan view of another embodiment of the invention.
FIG. 5 graphically illustrates a sectional plan view of another embodiment of the invention.

Instead of a single row of apertures as illustrated in FIG. 2, a plurality of rows of apertures 33 having a staggered pattern may be utilized as shown in FIG. 4. Alternatively, one web 34 may contain one set of apertures 36 and the other web 38 may contain a second set of apertures 40 as illustrated in FIG. 5. The apertures in one web are preferably not aligned with the apertures of the other web to ensure a stronger seam. In the embodiment of FIG. 5 both web 34 and web 38 should comprise thermoplastic material that will flow into the apertures.

Figure 6:
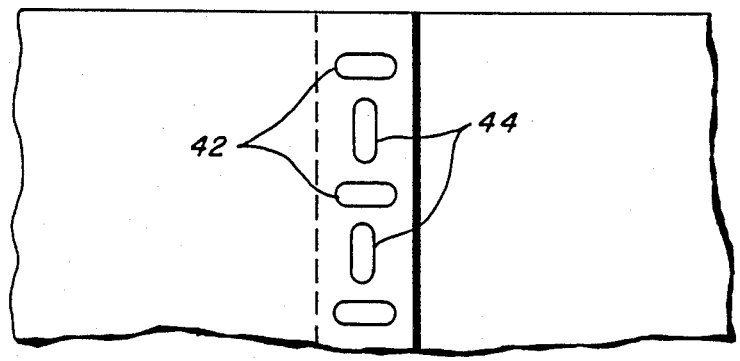
FIG. 6 graphically illustrates a sectional plan view of another embodiment of the invention.

As shown in FIG. 6, the apertures 42 may be of any suitable shape and need not have a circular cross-section. Further, apertures of one shape such as apertures 42 may be intermixed with apertures of another shape such as apertures 44 as illustrated in FIG. 6. Generally, rounded apertures free of sharp corners are preferred for stronger seams.

Figure 7:
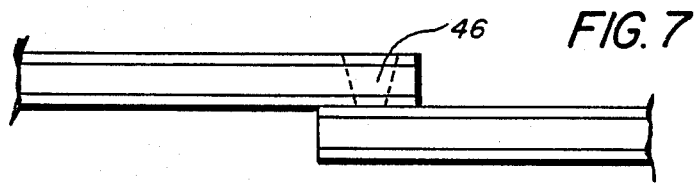
FIG. 7 graphically illustrates a sectional side view of another embodiment of the invention.

The cross-sectional dimensions of the apertures may also vary from one side of a web to the other side as illustrated by aperture 46 shown in FIG. 7.

Figure 8:
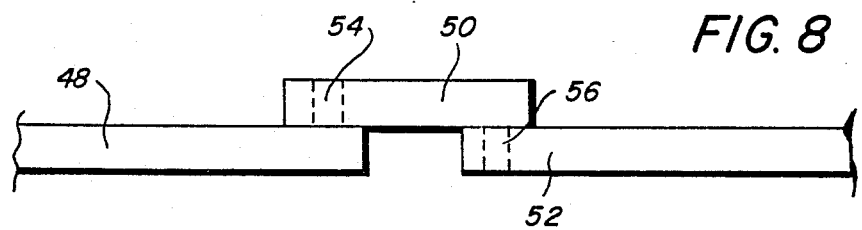
FIG. 8 graphically illustrates a sectional side view of a further embodiment of the invention.
Figure 9:
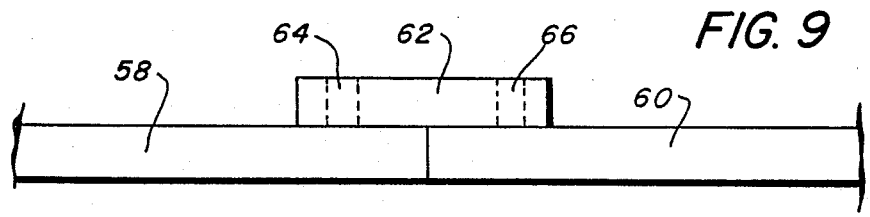
FIG. 9 graphically illustrates a sectional side view of still another embodiment of the invention.

Multiple webs may be joined by the process of this invention as shown in FIGS. 8 and 9. In FIG. 8, a thermoplastic web 48 is joined to a thermoplastic web 50 which is in turn joined to a thermoplastic web 52. In the embodiment shown in FIG. 8, thermoplastic web 50 contains apertures 54, thermoplastic web 52 contains apertures 56 and the ends of web 48 and web 52 are spaced from each other. In FIG. 9, thermoplastic web 58 is shown in contact with thermoplastic web 60. Web 62, which may be thermoplastic or non-thermoplastic, contains apertures 64 and 66. In all of the figures, it is important to note that it is necessary that thermoplastic material from the edge of one web to be joined flows into and at least partially fills at least one aperture in another edge of a web. A partially filled aperture is defined herein as an aperture in which the flowing thermoplastic material completely blocks the cross-sectional opening and fills at least half the aperture along the axial length of the aperture. Best results are achieved when the apertures are completely filled.

The web containing the aperture may be thermoplastic or non-thermoplastic. This technique may be utilized to join dissimilar or similar materials. The word "web" is intended to encompass webs, sheets, straps, and the like. The webs may be of any suitable shape and may be separate webs or a single web. The opposite edges of a single web may be joined to form, for example, a continuous loop, belt or mobius strip.

Any suitable thermoplastic material which will melt and flow at the temperatures generated at the contiguous overlapping web surfaces at the seam may be utilized. Typical thermoplastic materials include polyethylenes, polypropylenes, polycarbonates, polyvinylacetate, terephthalic acid resins, polyvinylchloride, styrene-butadiene copolymers and the like. The thermoplastic material that is induced to flow into and at least partially fill the apertures may be provided solely by a coating on the webs, from both a coating and a web substrate, or solely from the web itself.

Thus, for example, a non-thermoplastic web substrate may be coated with a thermoplastic material which is the sole source of the material which flows into and at least partially fill the apertures. Alternatively, for example, the web may be uncoated and consist entirely of the thermoplastic material, some of which flows into and at least partially fills the apertures.

The web may be of any suitable thickness which will allow adequate heating of the contiguous overlapping surfaces of the web edges to permit sufficient heat energy to be applied at the contiguous overlapping surfaces to melt and cause the thermoplastic material to flow into and at least partially fills the apertures. Preferred web thicknesses for use with ultrasonic welding can range from between about 25 micrometers to about 0.5 millimeter. Thicker webs may be utilized as long as sufficient heat is applied to the contiguous overlapping surfaces of the web to cause the thermoplastic material to melt and flow into the apertures. Webs having a thickness up to about 20 millimeters may be joined with the process of this invention.

The webs should overlap each other to the extent that the overlapping webs cover at least one or more of the apertures. A preferred range of overlap is between about 0.7 millimeter and about 1.7 millimeters.

Weld strength improvement can be achieved when even a small amount of the thermoplastic material melts and only partially fills the apertures. Optimum strength is achieved when the apertures after cooling are completely filled with the thermoplastic material.

The apertures may be of any suitable shape and size. Apertures free of sharp corners are preferred to avoid stress points which tend to weaken the web joint. The apertures may be formed by any conventional technique such as by drilling with twist drills or lasers, punching, molding, heated styli, and the like. Laser drilling is preferred for greater convenience and speed in forming small apertures. Excellent results have been achieved with apertures having a circular cross-section and a diameter between about 0.2 micrometers and about 0.4 micrometer formed by a laser beam having a substantially circular cross section. There is considerable latitude in selecting the spacing between apertures or between an aperture and an edge of the web. Apertures completely surrounded by web material are preferred as opposed to a partial aperture which would give the edge of the web a scalloped appearance. As indicated hereinabove, it is preferred that the apertures be located so that at least one aperture in a first edge is completely covered by another edge.

Any suitable heating technique may be used to provide the heat necessary at the contiguous overlapping surfaces to melt the thermoplastic material and cause it to flow into and at least partially fill the apertures. Typical heating techniques include ultrasonic welding, radio frequency heating and the like. Ultrasonic welding is preferred because it causes generation of heat at the contiguous overlapping surfaces of the web edges to maximize melting and flow of the thermoplastic material into the apertures. If desired, the anvil and/or the horn of an ultrasonic welding means may comprise highly thermoconductive material such as aluminum to ensure higher temperatures at the interface between the overlapping webs and minimize thermal distortion of the exposed surfaces of the thermoplastic webs. When ultrasonic welding is utilized it is believed that the rapid impaction of one web with the other web at the contiguous overlapping web surfaces between the anvil and horn causes generation of heat. A horn vibration frequency of about 16,000 kHz or higher may be utilized to cause the thermoplastic material to soften and flow into the apertures. A typical horn suitable for joining thin thermoplastic webs utilizes a sonic generator of about 400–800 watt capacity, an operational frequency of about 20 kHz, and a flat input horn welding surface about 12 centimeters long and about 0.04 to 0.1 centimeter wide. The horn can be positioned so that the longer side is perpendicular to the seam. A typical motion amplitude for this horn is about 76 micrometers. The combined weight of about 2.5 kilograms of the ultrasonic vibration generator and the horn assembly itself is sufficient to bring the horn into forced contact with the seam. However, a spring bias, weights or counterweights, or other suitable means may be utilized to increase or decrease the contact force. Since heat is generated very rapidly at the interface of the overlapping webs with this type of device, sufficient heat to cause the thermoplastic materials to melt and flow into the aperture can occur typically in about 0.2 second as the horn traverses the webs along the seam.

By way of example, a polyester film (Mylar, available from E. I. duPont de Nemours and Co.) having a width of about 414 millimeters and a thickness of about 76 micrometers and having a coating on one side of a polyester having a thickness of about 0.2 micrometer and a polyvinyl carbazole coating of about 3 micrometers thick was coated on both sides with a polycarbonate resin, each polycarbonate coating having a thickness of about 25 micrometers. The coated web was welded to another identical web by means of an ultrasonic welding device operating at a frequency of 20 kHz. One of the overlapping web edges comprised holes drilled by means of a 15 watt pulsed laser, the holes having an average diameter of about 250 micrometers having a center-to-center spacing of about 500 micrometers and center-to-edge of web spacing of about 380 micrometers. The other web edge free of apertures overlaps the edge with the apertures to form a seam width of about 1.2 millimeters. The seam is supported on an anvil along the entire length of the seam. The seam length is about 414 millimeters. The web is positioned on the anvil so that the web edge free of apertures lies against the surface of the anvil. The horn is biased against the seam due to the controlled weight of about 2.5 kilograms of ultrasonic transducer and horn support systems pressing against the seam supported by the anvil. The horn is guided along the seam at a rate of about 5 centimeters per second. This procedure caused the thermoplastic materials in the web free of apertures to melt and flow into and completely fill the apertures in the other web. The resulting seam resembled the structure graphically illustrated in FIG. 3. Tests of the seam revealed that its breaking strength was about 75 percent compared to the breaking strength of an identical web having no seams. Comparative tests with seams formed from identical webs containing no apertures exhibited a breaking strength at the seam of about one-third that of identical webs having no seams. Seams formed from edges containing apertures were also more flexible than seams formed from webs containing no apertures. For example, seams formed from edges containing apertures as described above could be easily bent around a rod having a diameter of about 6.35 millimeters whereas seams formed from edges free of apertures as described above readily fractured and/or delaminated when bent around the same rod. Moreover, seams formed with webs having apertures had a thickness of about 75 percent of the original double thickness prior to treatment with the ultrasonic horn.

Other modifications of the present invention will occur to those skilled in the art based upon a reading of the present disclosure. These are intended to be included within the scope of this invention.

We claim:

1. A welded, flexible, thermoplastic belt comprising a web having an outer coating of thermoplastic material along substantially the entire length of said web, said thermoplastic belt having a seam comprising a first edge of said web having a plurality of apertures overlapping an opposite edge of said web, said opposite edge comprising a portion of said outer coating of said thermoplastic material, to form a region of contiguous contact between said first edge and said portion of said outer coating of said thermoplastic material on said opposite edge, said thermoplastic material substantially filling said apertures thereby bonding said first edge to said opposite edge.

2. A welded, flexible, thermoplastic belt in accordance with claim 1 wherein said plurality of apertures are arranged in a plurality of rows.

3. A welded, flexible, thermoplastic belt in accordance with claim 1 wherein said opposite edge of said web comprises a plurality of apertures.

4. A welded, flexible, thermoplastic belt in accordance with claim 1 wherein said apertures in said first edge are covered by thermoplastic material along said opposite edge free of any aperture.

5. A welded, flexible, thermoplastic belt comprising a web having an outer coating of thermoplastic material along substantially the entire length of said web, said thermoplastic belt having a seam comprising a first edge of said web having a plurality of apertures overlapping an opposite edge of said web, said opposite edge comprising a portion of said outer coating of said thermoplastic material, to form a region of contiguous contact between said first edge and said portion of said outer coating of said thermoplastic material on said opposite edge, said thermoplastic material substantially filling said apertures thereby bonding said first edge to said opposite edge to form a seam having a thickness less than the thickness of the doubled thickness of said web.

6. A welded, flexible, thermoplastic belt comprising a web having an outer coating of thermoplastic material along substantially the entire length of said web, said thermoplastic belt having a seam comprising a first edge of said web having a plurality of apertures overlapping an opposite edge of said web, said opposite edge comprising a portion of said outer coating of said thermoplastic material, to form a region of contiguous contact between said first edge and said portion of said outer coating of said thermoplastic material on said opposite edge, said thermoplastic material substantially filling said apertures thereby bonding said first edge to said opposite edge to form a seam, said apertures being tapered with the narrower end of said apertures located adjacent said region of contiguous contact between said first edge and said thermoplastic material.

* * * * *